United States Patent
Rooks et al.

(10) Patent No.: US 8,238,945 B2
(45) Date of Patent: Aug. 7, 2012

(54) CORDLESS PHONE MESH NETWORK

(75) Inventors: Kelsyn D. S. Rooks, Overland Park, KS (US); Jeffrey Sweeney, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 505 days.

(21) Appl. No.: 12/389,157

(22) Filed: Feb. 19, 2009

(65) Prior Publication Data

US 2010/0210289 A1 Aug. 19, 2010

(51) Int. Cl.
*H04W 4/00* (2009.01)

(52) U.S. Cl. ............... 455/463; 455/11.1; 455/464

(58) Field of Classification Search ............ 455/463, 455/462, 464, 465, 459, 411, 552.1, 74.1; 370/280, 332, 337, 350, 347; 380/257, 41, 380/243; 713/153
See application file for complete search history.

(56) References Cited

U.S. PATENT DOCUMENTS

| | | | |
|---|---|---|---|
| 5,926,766 A * | 7/1999 | Yamagata et al. | 455/464 |
| 6,198,921 B1 * | 3/2001 | Youssefzadeh et al. | 455/428 |
| 6,339,695 B1 * | 1/2002 | Clark | 455/41.1 |
| 6,366,572 B1 * | 4/2002 | Esterberg et al. | 370/343 |
| 2002/0115455 A1 * | 8/2002 | Umstetter et al. | 455/462 |
| 2003/0092453 A1 * | 5/2003 | Mills et al. | 455/463 |
| 2006/0019679 A1 * | 1/2006 | Rappaport et al. | 455/456.5 |
| 2007/0071006 A1 * | 3/2007 | Bosch et al. | 370/392 |
| 2007/0273504 A1 * | 11/2007 | Tran | 340/539.12 |
| 2010/0190533 A1 * | 7/2010 | Black et al. | 455/571 |

* cited by examiner

*Primary Examiner* — Nick Corsaro
*Assistant Examiner* — Mahendra Patel
(74) *Attorney, Agent, or Firm* — Swanson & Bratschun, L.L.C.

(57) ABSTRACT

A system and method for providing a cordless telephone mesh network may include monitoring, by a cordless telephone base unit, a cordless communications parameter of a cordless communications signal being received from a cordless telephone handset during a telephone call. A determination that the cordless communications parameter crossed a predetermined threshold level may be made. In response to determining that the cordless communications parameter crossed the predetermined threshold value, at least one other cordless telephone handset may be caused to switch into a repeater mode so as to receive and communicate the cordless communications signal between the cordless telephone handset and the base unit.

15 Claims, 4 Drawing Sheets

CORDLESS PHONE MESH NETWORK

BACKGROUND

Home and office telecommunications have significantly developed since the days of wall mounted telephones. Today there are a wide range of telecommunications systems and technologies. Cordless telephony, Voice over Internet Protocol (VoIP) telephony, and mobile telephony are a few examples of newer telephone technologies that are available to home and business users.

A majority of home telephony uses traditional wired or cordless technologies. Cordless telephony is generally defined as a telephone that includes a base unit and cordless handset that communicate with one another over a cordless frequency using a cordless communications protocol. The base unit is typically connected to the public switched telephone network (PSTN) via a wired connection. Cordless telephone technology has improved over the years—primarily to improve the quality of the wireless communications between the handset and base unit. The quality has been improved by changing the wireless telecommunications link from an analog link to a digital link. The digital link, too, has been improved by utilizing different telecommunications protocols and different frequencies. For the most part, the frequencies at which the digital links operate have increased from 700 MHz to 900 MHz, 1.9 GHz, 2.4 GHz, and 5.8 GHz frequency ranges. The digital cordless communications protocols have also changed to improve voice, data, and security quality. However, while improvements and changes have occurred in cordless telephony, one aspect of cordless telephony that remains a problem is range of cordless telephone communications.

As understood in the art, the range of cordless telephones is relatively limited due to the higher frequencies and power limitations. Depending on location of the base unit, construction of a home or office, and furniture in the home or office, range of cordless telephone handsets are affected. A user of a cordless telephone routinely finds that certain rooms or locations within a home or office have poor or no reception. Because cordless communications protocols are typically communicated over analog channels, cordless telephones tend to have static when a user extends a separation distance of the cordless handset from the base unit too far. One option to alleviate these situations is to have multiple cordless telephones in a home or office, but telephone base units can be expensive and do not solve the problem of not being able to use a cordless handset from a base unit too far to be used in certain locations in a home or office. In this case, to extend the range of the cordless telephone into the locations with poor or no reception requires a user to switch handsets during a conversation, which is not always convenient or possible (e.g., other handset not at other base unit).

SUMMARY

To overcome range limitations of cordless telephones used within homes and offices, the principles of the present invention provide for a cordless telephone mesh network configured to enable one or more cordless telephone handsets to operate as repeaters so that a single base unit with one or more handsets distributed throughout a home or office provides a user with greater range than the range of conventional cordless telephones. The cordless telephone mesh network may be configured with a single base unit and one or more handsets that are capable of communicating with one another and the base unit so that a user who is using a handset that extends beyond the range of the base unit is extended in range by the handset communicating with one or more other handsets that are capable of directly or relaying a communications signal via one or more other handsets to the base unit. In one embodiment, the base unit may be configured to monitor a cordless communications parameter, such as quality or power, from the cordless handset being utilized by the user and, in response to determining that the cordless communications parameter crossed a predetermined threshold level, activate other handset(s) to operate as repeaters for the handset being utilized by the user. If the handset(s) not being used by the user are on a charger, then the other handset(s) may remain in an active repeater state, but if not on a charger, remain in a passive repeater state until activated to operate as a repeater, thereby saving battery power of the handsets.

One embodiment of a cordless telephone mesh network may include a base unit and a plurality of cordless telephone handsets. The handsets may be configured to operate in telephone and repeater modes. The base unit may be configured to monitor a cordless communications parameter of a wireless communications signal between the base unit and a cordless telephone handset while in use during a telephone call. In response to determining that the cordless communication parameter crosses a predetermined threshold value, the base unit may further be configured to cause at least one of the cordless telephone handsets not currently being used to switch into a repeater mode so as to receive and communicate the cordless communications signal between the cordless telephone handset and base unit.

One embodiment of a method for providing a cordless telephone mesh network may include monitoring, by a cordless telephone base unit, a cordless communications parameter of a cordless communications signal being received from a cordless telephone handset during a telephone call. A determination that the cordless communications parameter crossed a predetermined threshold level may be made. In response to determining that the cordless communications parameter crossed the predetermined threshold value, at least one other cordless telephone handset may be caused to switch into a repeater mode so as to receive and communicate the cordless communications signal between the cordless telephone handset and the base unit.

One embodiment of a cordless telephone mesh network may include a base unit, a first cordless telephone handset configured to communicate cordless communications signals with and be charged by the base unit, a second cordless telephone handset, and a charger unit configured to charge the second cordless telephone handset. The second cordless telephone handset may be configured to repeat the cordless communications signal received from the first cordless telephone handset to the base unit.

BRIEF DESCRIPTION

Illustrative embodiments of the present invention are described in detail below with reference to the attached drawing figures, which are incorporated by reference herein and wherein.

DETAILED DESCRIPTION

Figure 1:
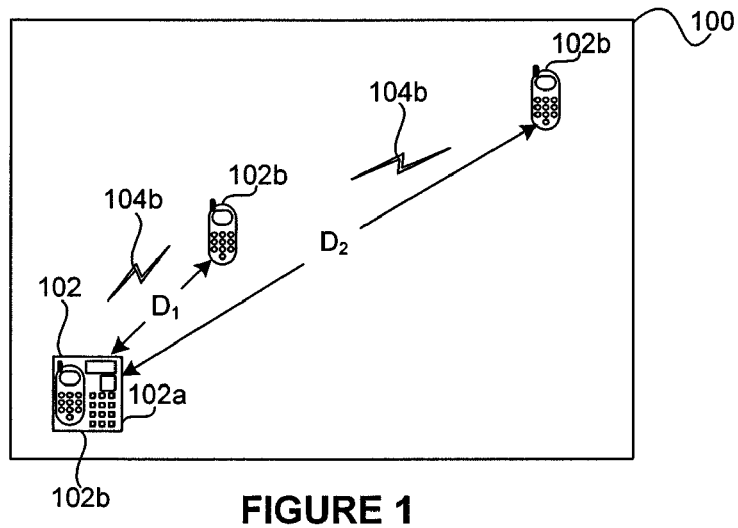
FIG. 1 is an illustration of an illustrative structure, such as a house or office, in which a cordless telephone is used.

With regard to FIG. 1, an illustrative structure 100, such as a home or office, may have a cordless telephone 102 that includes a base unit 102a and cordless handset 102b. As understood in the art, the cordless telephone handset 102b may be utilized by a user to conduct telephone calls without having a wired connection between the cordless handset 102b and base unit 102a. A limitation of cordless telephones is a communication range between the cordless handset 102b and base unit 102a. As shown, the cordless handset 102b at a distance $D_1$ away from the base unit 102a communicates with the base unit 102a with a cordless communications signal 104a. The cordless handset at a distance $D_2$ communicates with the base unit 102a with cordless communications signal 104b. While the two cordless communication signals 104a and 104b may have the same signal strength as communicated from the cordless handset 102b, due to the distance $D_2$ being farther than the distance $D_1$, the base unit 102a receives the cordless communications signal 104b with a lower signal strength than that of cordless communications signal 104a. If the distance $D_2$ is far enough or has certain environmental factors or structural components to pass through, the cordless communications signal 104b may be reduced in signal strength even more.

In addition to signal strength being a cordless communications parameter that affects communication quality between the base unit 102a and cordless handset 102b, another cordless communications parameter that may impact communications between the cordless handset 102b and base unit 102a is bit error rate (HER). Noise is yet another cordless communications parameter that affects communication quality between the base unit 102a and cordless handset 102b. As understood in the art, as the cordless handset 102b extends beyond the range of the cordless handset 102b to be able to communicate with the base unit 102a, the cordless communication signal 104b may begin to drop in signal strength and increase noise and bit error rate, thereby static on the communications signal 104b.

Figure 2:
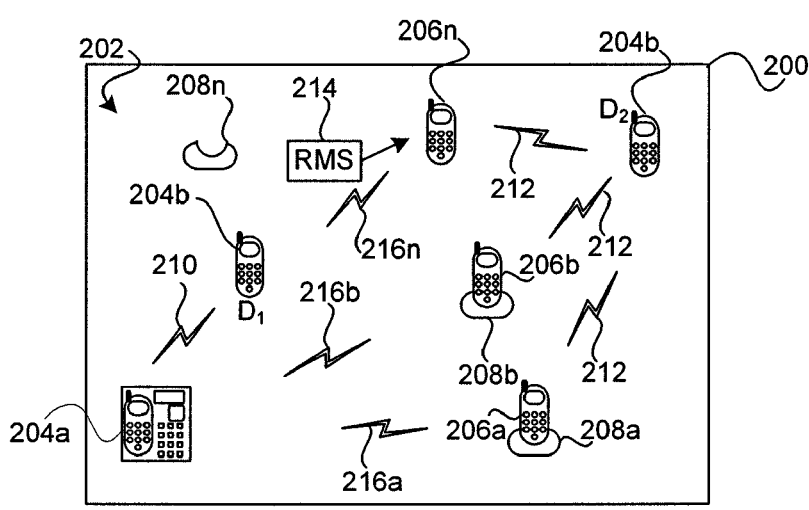
FIG. 2 is an illustration of an illustrative structure in which a cordless telephone mesh network is shown to be utilized in accordance with the principles of the present invention.

With regard to FIG. 2, an illustrative structure 200, such as a house or office building, may utilize a cordless telephone mesh network 202 in accordance with the principles of the present invention. The cordless telephone mesh network 202 may include a base unit 204a and handset 204b. In addition, the cordless telephone mesh network 202 may include one or more other cordless handsets 206a-206n (collectively 206) that are configured to be charged by charger units 208a-208n (collectively 208), respectively. The cordless telephone mesh network 202 may enable the cordless handset 204b to communicate directly with the base unit 204a when at a distance of $D_1$ as the cordless handset 204b may have a cordless communications signal at a signal strength that provides for quality communications. However, as the cordless handset 204b reaches a distance of $D_2$, the other cordless handsets 206 may be configured to repeat cordless communications signals 212 received from the cordless handset 204b, thereby extending the range of the cordless handset 204b. As the cordless handset 204b reaches a distance such that a cordless communications parameter, such as signal strength, bit error rate, or noise, crosses a predetermined threshold value, such as signal strength below −25 dBm, the base unit 204a may cause the other cordless handsets to switch into a repeater mode. More specifically, in response to the base unit 204a determining that at least one cordless communications parameter crosses a predetermined threshold value, the base unit 204a may communicate a repeater mode command signal 214 to one or more cordless handsets 206 to switch the cordless handset(s) 206 into a repeater mode. The cordless handsets 206 may be configured to receive the repeater mode command signal 214 and, if not being charged on one of the charger units 208, switch into repeater mode. If the cordless handsets 206 are currently being charged, such as cordless handsets 206a and 206b, then the cordless handsets may be in an active repeater mode so as to receive a cordless communications signal 212 from the cordless handset 204b and repeat the cordless communications signal 212 as cordless communication signals 216a and 216b. Because the cordless handsets 206a and 206b are currently being charged, power drain on batteries of each of the respective cordless handsets while in the active repeater mode will be minimal. Cordless handset 206n, which is not currently being charged by charger unit 208n, may be in a passive repeater mode, which enables the cordless handset 206n to switch into repeater mode in response to receiving the repeater mode signal 214. It should be understood that if any of the cordless handsets 206 are being used for an active telephone call that the cordless handset(s) may not be switched into repeater mode.

In an alternative embodiment, if the cordless handsets 206 have multiple transceivers (i.e., one for performing traditional cordless telephone operations and another for handling repeater functionalities), then the cordless telephones 206 may be utilized for performing telephone calls while simultaneously repeating cordless communications signals from other cordless handsets. As the cordless telephone mesh network 202 enables cordless communications signals to be communicated between handsets so as to be "routed" to the base unit 204a via one or more of the cordless telephones 206, each of the cordless handsets 204b and 206 may be configured to receive cordless communication signals from any of the other cordless handsets and repeat the cordless communication signals so that the cordless communication signals eventually are communicated to the base unit 204a. In one embodiment, each cordless handset 206 may be configured to communicate using one of multiple potential cordless frequencies (e.g., 900 MHz and 2.4 GHz) by using an oscillator capable of producing the different frequencies as center carrier frequencies.

Figure 3:
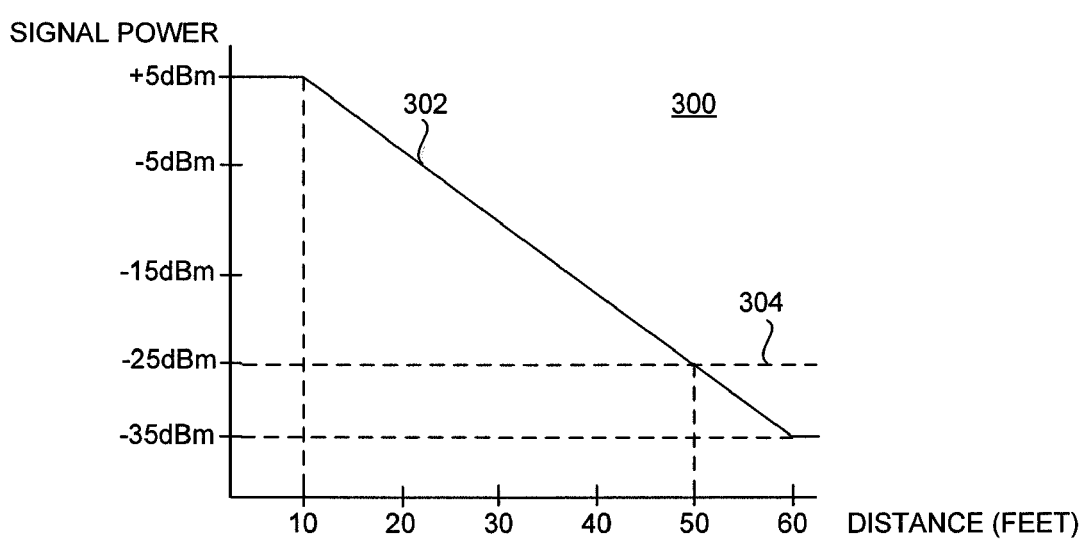
FIG. 3 is a graph showing an illustrative power curve versus distance of a cordless telephone.

With regard to FIG. 3, a graph 300 of an illustrative communication signal power curve 302 that describes a relationship between signal power or strength and distance of a cordless handset to a base unit is shown. As shown, the signal power within a distance or range of 10 feet has negligible drop. At a distance between 10 feet and 50 feet the power curve 302 is substantially linear in power loss. At approximately 60 feet, the signal power drops to −35 dBm, which may create a significant degradation in communication between the cordless handset and base unit due to a signal-to-noise level being low. In one embodiment, to prevent degradation of the communications signal between the cordless handset and the base unit, a cordless communication parameter for signal power may be set at a threshold value 304 of −25 dBm. When signal power of a cordless communication signal drops below the threshold value 304, the base unit may communicate a repeater mode command signal to one or more cordless handsets within communication range of the base unit. In one embodiment, the repeater mode command signal may be communicated at a higher amplitude or power level than a maximum cordless communication signal (e.g., at 0 dBm) to ensure that the cordless handsets within communication range receive and respond to the repeater mode command signal to transition into repeater mode. Although shown as being linear, it should be understood that the power curve 302 may be nonlinear over various portions of the curve. Furthermore, the power curve 302 may represent an ideal case scenario without taking into account particular environmental construction, and furniture factors within a home or office setting, where these factors may alter actual operation of the cordless telephone within the home or office setting.

Figure 4:
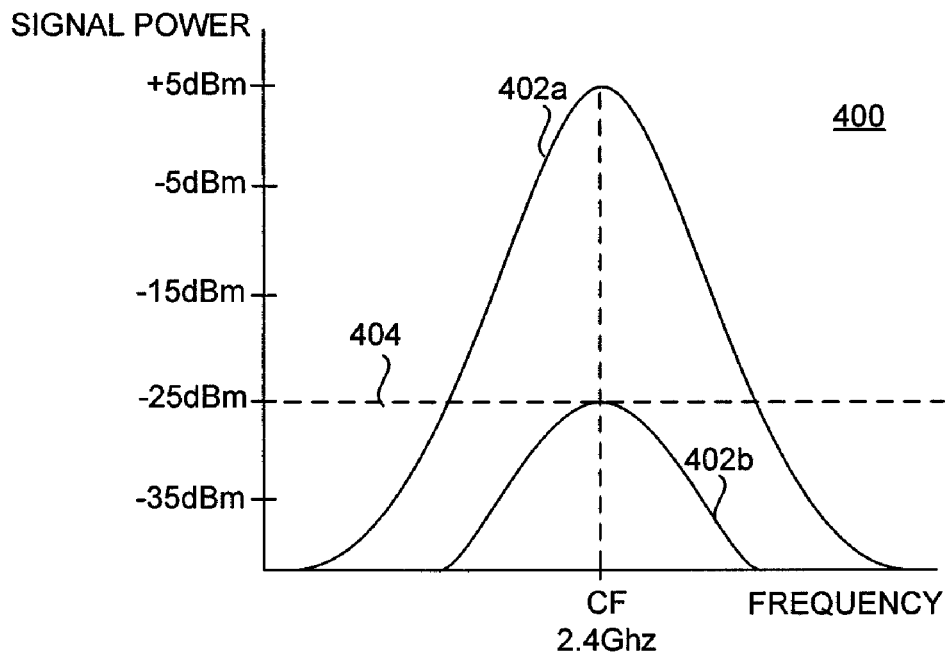
FIG. 4 is a graph of illustrative communications signals having different signal strengths as a result of a cordless handset being at different distances from the base unit.

With regard to FIG. 4, a graph 400 showing power curves 402a and 402b of cordless communication signals being received by a base unit from a cordless handset at a distance of 10 feet and 50 feet, respectively, is shown. A center frequency (CF) of 2.4 GHz for the cordless communication signal is utilized. It should be understood that the center frequency may be positioned at any other cordless frequency range (e.g., 900 MHz). A cordless threshold value 404 may be established or predetermined that, in response to a peak cordless communications signal dropping below the cordless threshold value 404, causes the base unit to cause at least one other cordless handset to switch into a repeater mode. It should be understood that each cordless handset may also be configured with a cordless signal power measurement circuit that measures peak power of a cordless communications signal being received from the base unit to cause at least one other cordless handset to switch into a repeater mode by communicating a repeater mode command signal so as to repeat cordless communications signals between the basement and cordless handset, thereby extending the range of the cordless handset.

Figure 5:
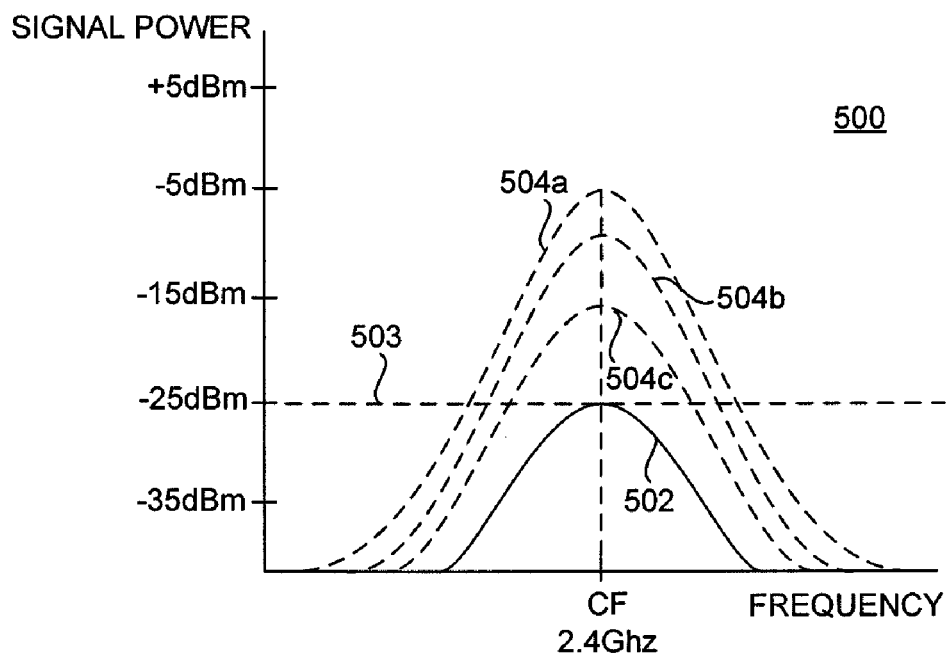
FIG. 5 is a graph of illustrative communications signals received by a base unit from cordless handsets repeating a communications signal from a cordless handset positioned at a range from the base unit at which signal strength is below a predetermined threshold value.

With regard to FIG. 5, a graph 500 shows a cordless communications signal 502 dropping below a predetermined cordless threshold parameter 503. Three other cordless communication signals 504a-504c are also shown. Each of these cordless communication signals are repeated by respective cordless handsets in a cordless telephone mesh network and received by a base unit in the cordless telephone mesh network. In one embodiment, the base unit may measure the repeated cordless communication signals 504a-504c and select the cordless communication signal that has the highest signal strength, in this case cordless communications signal 504a. Although shown as signal strength, it should be understood that other cordless communications parameters, such as bit error rate or noise levels, may be used to trigger a repeater mode command signal to be communicated to the other cordless handsets. The threshold values for other cordless communications parameters may be maximum values that, when crossed, causes a base unit or cordless handset to initiate switching of cordless handset(s) into a repeater mode by communicating the repeater mode command signal.

Figure 6:
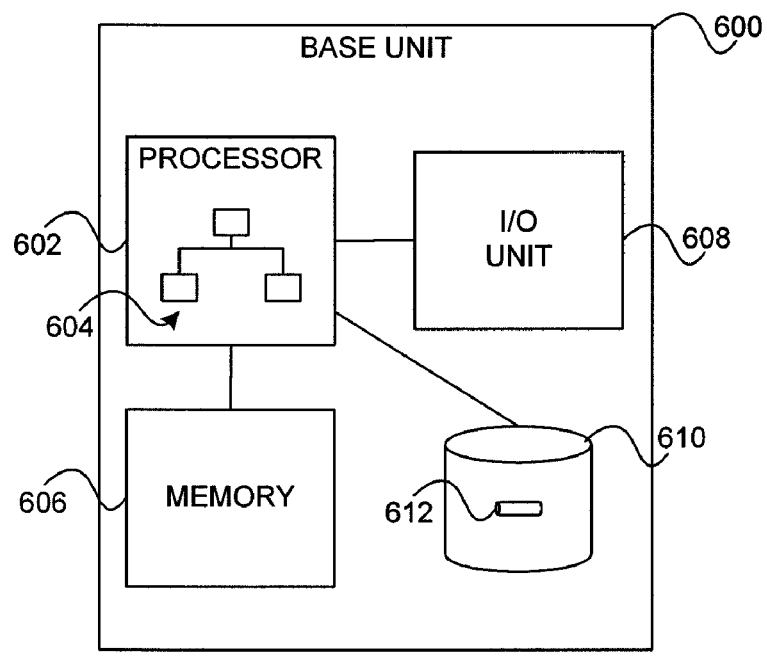
FIG. 6 is a block diagram of an illustrative base unit configured to provide for repeater functionality in accordance with the principles of the present invention.

With regard to FIG. 6, an illustrative base unit 600 is shown to include a processing unit 602 that executes software 604. The software 604 may be configured to monitor cordless communication signals and cause cordless handsets to switch into or out of a repeater mode. The processing unit 602 may be in communication with a memory 606, input/output (I/O) unit 608, and storage unit 610. In one embodiment, the storage unit 610 may be configured to store a data repository 612, such as a database. In one embodiment, the storage unit 610 is a memory device. Alternatively, the storage unit 610 may be a hard disk or other storage medium. The memory 606 may be configured to store data and software during execution of the software 604 by the processing unit 602. The data may include communications signal data that is processed by the software 604. The I/O unit 608 may be configured to perform wired and/or wireless communications between the base unit 600 and one or more cordless handsets (not shown) and public switched telephone network. In one embodiment, the I/O unit 608 may include a single transceiver for communicating with one or more cordless handsets. Alternatively, the I/O unit 608 may be configured with multiple transceivers to perform simultaneous communications with multiple cordless handsets.

Figure 7:
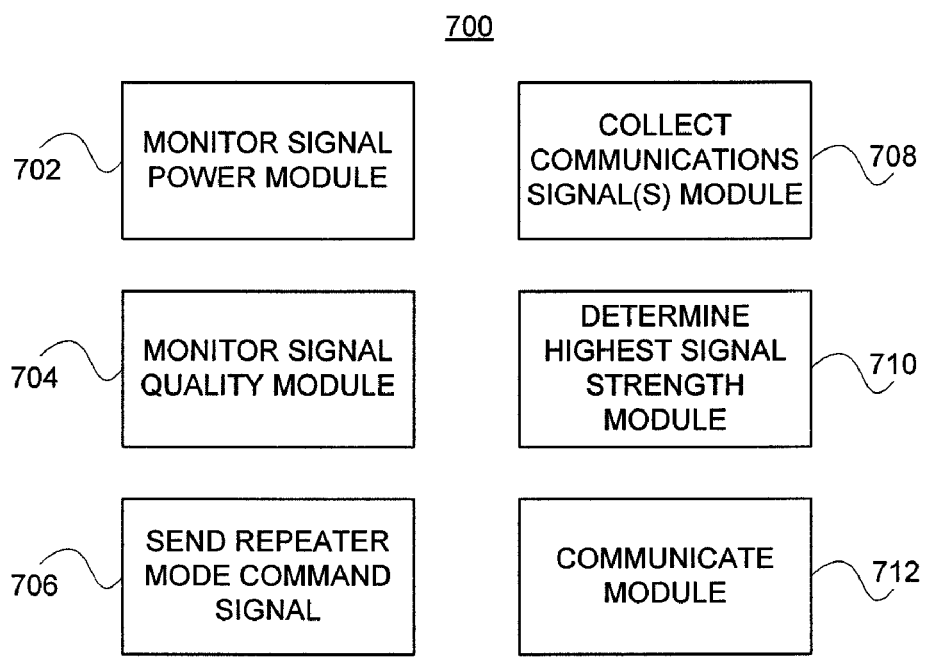
FIG. 7 is a block diagram of illustrative modules configured to operate on a base unit to provide for cordless telephone mesh network functionality.

With regard to FIG. 7, modules 700 may be utilized to perform cordless telephone mesh network functionality in accordance with the principles of the present invention. The modules 700 may be hardware, software, firmware or combinations thereof and be executed by a processing unit or other circuitry within the base unit.

The modules 700 may include a monitor signal power module 702 that may be configured to monitor signal power of a cordless communications signal being received from one or more cordless handsets. The monitor signal power module 702 may be configured to identify (i) peak signal power at or about the center frequency of the cordless frequency being utilized or (ii) a 3 dB point below the peak signal power.

A monitor signal quality module 704 may be configured to monitor signal quality by determining noise floor, bit error rate, or signal-to-noise ratio, for example. The monitor signal quality module 704 may utilize any algorithms for monitoring signal quality, as understood in the art.

A send repeater mode command signal 706 may be configured to receive an indication from either the monitor signal power module 702 or monitor signal quality module 704 that the signal power or signal quality crosses a predetermined threshold value and, in response, send a repeater mode command signal to cordless handsets within communications range of the base unit. In one embodiment, the repeater mode command signal may have a signal power that exceeds signal power of cordless communication signals to insure that cordless handsets receive the repeater mode command signal from the base unit. The repeater mode command signal may be a signal positioned at a different center frequency, be a certain digital code, or be any other signal type and use any communications protocol, as understood in the art.

A collect communications signal(s) module 708 may be configured to collect communications signals being received from one or more cordless handsets within range of the base unit. The communications signals may be collected or otherwise received and processed to enable the base unit to determine which of multiple cordless communications signals has the highest signal strength in the event that multiple communications signals are being received by the base unit as one or more cordless handsets are operating in repeater mode.

A determine highest signal strength module 710 may communicate with the collect communications signal(s) module 708 and be configured to determine the highest signal strength of cordless communication signals being received from one or more cordless handsets. In addition, the determine high signal strength module 710 may identify a specific cordless communications signal as associated with a particular cordless handset that is communicating the cordless communications signal, thereby enabling the base unit to limit communications to that cordless handset so as to avoid communications from other cordless handsets, which could otherwise cause interference.

A communicate module 712 may receive information from the determined highest signal strength module 710 to identify a cordless handset and cordless communications signal that has the highest signal strength. The communicate module 712 may be configured to include hysteresis such that the base unit, once communicating with a cordless handset, remains communicating with the cordless handset until the cordless communications signal of that cordless handset crosses a predetermined cordless threshold value. In one embodiment, the communicate module 712 may periodically request the cordless communications signal with the highest signal strength from the determine highest signal strength module 710, so as to switch back to communicating directly with the cordless handset being used by a user should the cordless handset be repositioned closer to the base unit than the handset in repeater mode during a telephone call. Although not shown, the modules 700 may include a module that causes the cordless handsets to exit repeater modes should the cordless handset with which the base unit is in communication has the highest signal strength. It should be understood that a module may be configured to determine a best communications signals, where best may be highest signal strength, lowest bit error rate, lowest noise floor, or highest signal-to-noise ratio, for example.

Figure 8:
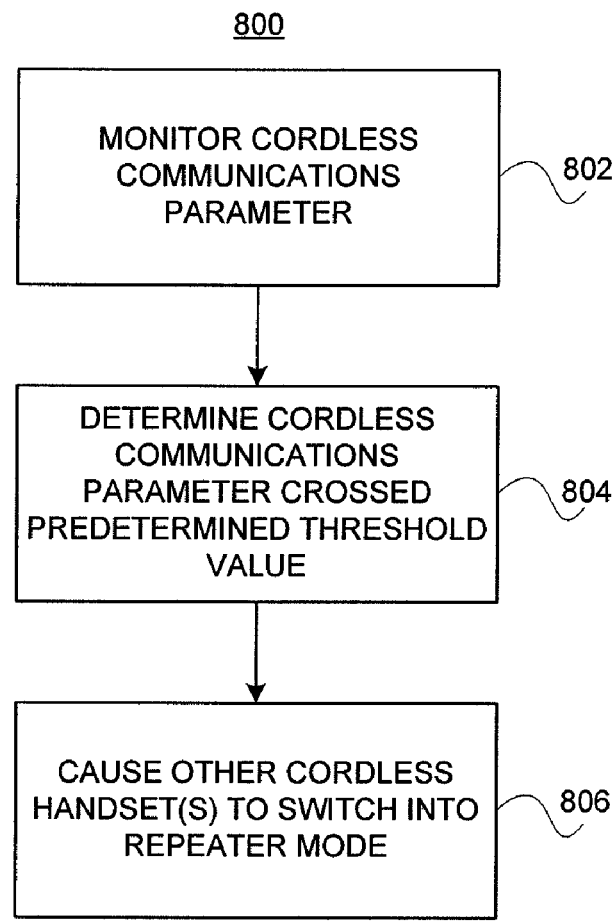
FIG. 8 is a flow diagram of an illustrative process for performing cordless telephone mesh network functionality in accordance with the principles of the present invention.

With regard to FIG. 8, an illustrative process 800 for providing cordless telephone mesh network functionality is shown. The process 800 may include step 802 for monitoring a cordless communications parameter. The cordless communications parameter may include signal strength, bit error rate, noise level or floor, signal-to-noise ratio, or any other cordless communications parameter. At step 804, a determination may be made as to whether a cordless communications parameter crossed a predetermined threshold value. The predetermined threshold value may be set at a level that ensures that the cordless communications signal does not reach a level that causes a user to hear static or other poor communications quality. For example, the predetermined threshold value may be a signal strength that is 10 dB above a signal strength level that would cause the user to hear static or other signal "breakup" during a telephone call. At step 806, the process 800 may cause other cordless telephone(s) or handsets to switch into a repeater mode. In causing the other cordless handsets to switch into the repeater mode, the base unit may communicate a repeater mode command signal to cordless handsets within communications range of the base unit.

Figure 9:
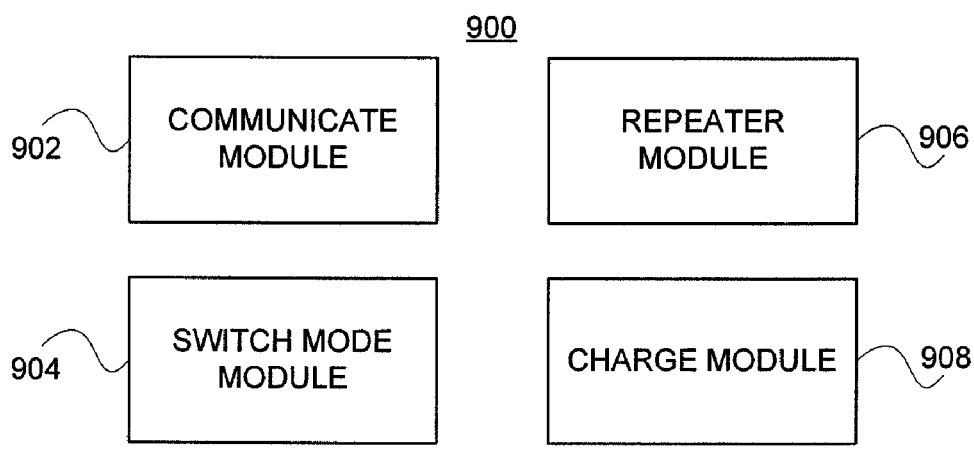
FIG. 9 is a block diagram of illustrative modules configured to operate on a cordless telephone handset to provide cordless telephone mesh network functionality in accordance with the principles of the present invention.

With regard to FIG. 9, modules 900 may be utilized on a cordless handset to provide for the cordless telephone mesh network in accordance with the principles of the present invention. A communicate module 902 may be configured to enable a cordless handset to communicate with a base unit. A switch mode module 904 may be configured to cause the cordless handset to switch from a standard communication mode into a repeater mode. A repeater module 906 may be configured to enable the cordless handset to receive and communicate communications signals between another cordless handset and base unit. In one embodiment, the switch mode module 904 and repeater module 906 may be configured to operate in a passive or active repeater mode, where a passive repeater is a mode in which the cordless telephone is not in a repeater mode, but may be transitioned into a repeater mode through receipt of a repeater mode command signal from a base unit. An active repeater mode is a mode in which the cordless handset actively remains in repeater mode, such as when being charged on a charger unit. A charge module 908 may be configured to charge a rechargeable battery when plugged into or otherwise connected to a charger unit, as understood in the art.

What is claimed is:

1. A cordless telephone mesh network, comprising:
a base unit; and
a plurality of cordless telephone handsets configured to operate in telephone and repeater modes;
wherein the base unit is configured to:
monitor one or more cordless communications parameters of a first cordless communications signal between the base unit and a first cordless telephone handset while in use during a telephone call; and
in response to determining that the one or more cordless communication parameters crosses predetermined threshold values, monitor signal strengths of communication signals between the base unit and each of the plurality of cordless telephone handsets;
identify a second cordless telephone handset associated with a highest signal strength;
cause at least the second cordless telephone handset to switch into the repeater mode so as to receive and communicate the first cordless communications signal between the first cordless telephone handset and the base unit; and
switch from communicating with the first cordless telephone handset to communicating with the second cordless telephone handset; and
wherein the cordless telephone handsets are further configured to:
monitor for a repeater mode command signal from the base unit; and
in response to receiving the repeater mode command signal, repeat the first cordless communication signal.

2. The cordless telephone mesh network according to claim 1, wherein the first wireless communications signal communicated between the base unit and the cordless telephone handset is enabled to be repeated a plurality of times through two or more of the plurality of cordless telephone handsets.

3. The cordless telephone mesh network according to claim 1, further comprising a charger unit for each of the cordless telephone handsets not positioned at the base unit.

4. The cordless telephone mesh network according to claim 1, wherein the base unit is further configured to utilize hysteresis to avoid switching from communicating with the first cordless handset to communicating with the second cordless handset prior to the cordless communications parameters crossing the predetermined threshold values.

5. The cordless telephone mesh network according to claim 1, wherein the base unit is further configured to communicate the repeater mode command signal using a higher signal strength than the maximum signal strength of the first cordless communications signal.

6. The cordless telephone mesh network according to claim 1, wherein each of the cordless handsets are configured to communicate using one of multiple cordless frequencies.

7. A method for providing a cordless telephone mesh network, the method comprising:
monitoring, by a cordless telephone base unit, one or more cordless communications parameters of a first cordless communications signal being received from a first cordless telephone handset during a telephone call;

determining that the one or more cordless communications parameters crossed one or more predetermined threshold values; and in response determining that the one or more cordless communications parameters crossed predetermined threshold values, monitoring signal strengths of communication signals between the base unit and each of a plurality of cordless telephone handsets;

identifying a second cordless telephone handset associated with a highest signal strength;

causing, by the base unit, at least the second cordless telephone handset to switch into a repeater mode so as to receive and communicate the cordless communications signal between the cordless telephone handset and the base unit;

switching, by the base unit from communicating with the first cordless telephone handset to communicating with the second cordless telephone handset;

monitoring, by the second cordless telephone handset for a repeater mode command signal from the base unit;

in response to receiving the repeater mode command signal, repeating, by the second cordless telephone handset, the first cordless communications signal.

8. The method according to claim 7, wherein the cordless communications parameters indicate signal quality.

9. The method according to claim 7, further comprising providing a charging unit with each other cordless handset for charging the other cordless handsets remotely from the base unit.

10. The method according to claim 7, further comprising utilizing hysteresis to avoid switching from communicating with the first cordless handset to communicating with the second cordless handset prior to the cordless communications parameters crossing the predetermined threshold values.

11. The method according to claim 7, further comprising communicating the repeater mode command signal using a higher signal strength than the maximum signal strength of the first cordless communications signal.

12. The method according to claim 7, further comprising communicating the first cordless communications signal using one of multiple cordless frequencies.

13. A cordless telephone mesh network, comprising:

a base unit;

a first cordless telephone handset configured to communicate cordless communications signals with and be charged by the base unit;

a second cordless telephone handset; and a charger unit configured to charge the second cordless telephone handset;

wherein the base unit is configured to:

monitor one or more cordless communications parameters of a first cordless communications signal between the base unit and a first cordless telephone handset while in use during a telephone call; and in response to determining that the one or more cordless communication parameters crosses predetermined threshold values, monitor signal strengths of communication signals between the base unit and each of a plurality of cordless telephone handsets;

identify the second cordless telephone handset as having a highest signal strength;

cause at least the second cordless telephone handset to switch into a repeater mode so as to receive and communicate the first cordless communications signal between the first cordless telephone handset and the base unit; and switch from communicating with the first cordless telephone handset to communicating with the second cordless telephone handset; and wherein the second cordless telephone handset is configured to:

monitor for a repeater mode command signal from the base unit; and in response to receiving the repeater mode command signal, repeat the first cordless communication signal.

14. The method according to claim 13, wherein the second cordless telephone handset is configured to be in an active repeater mode while being charged by the charger unit, and wherein the second cordless telephone handset is configured to be in a passive repeater mode while not being charged by the charger unit or in use.

15. The method according to claim 13, wherein the cordless communications signals between the first cordless telephone handset and the base unit is enabled to be repeated a plurality of times by two or more of the plurality of telephone handsets including at least the second cordless telephone handset.

* * * * *